(12) United States Patent
Goto

(10) Patent No.: US 8,084,758 B2
(45) Date of Patent: Dec. 27, 2011

(54) LIGHT SENSOR FOR DETECTING BRIGHTNESS

(75) Inventor: Koichi Goto, Kariya (JP)

(73) Assignee: Denso Corporation, Kariya (JP)

( * ) Notice: Subject to any disclaimer, the term of this patent is extended or adjusted under 35 U.S.C. 154(b) by 446 days.

(21) Appl. No.: 12/327,064

(22) Filed: Dec. 3, 2008

(65) Prior Publication Data
US 2009/0152449 A1 Jun. 18, 2009

(30) Foreign Application Priority Data
Dec. 13, 2007 (JP) ................................. 2007-322579

(51) Int. Cl.
*G01N 21/85* (2006.01)
(52) U.S. Cl. .................. 250/573; 250/216; 250/227.25; 250/574; 356/436
(58) Field of Classification Search ............. 250/227.25, 250/573–574, 216; 356/436
See application file for complete search history.

(56) References Cited

U.S. PATENT DOCUMENTS

| | | | | |
|---|---|---|---|---|
| 5,262,640 A | * | 11/1993 | Purvis et al. ............. | 250/227.25 |
| 5,661,303 A | * | 8/1997 | Teder ......................... | 250/341.8 |
| 6,052,196 A | * | 4/2000 | Pientka et al. ............. | 356/445 |
| 6,285,037 B1 | * | 9/2001 | Koyama et al. ............ | 250/574 |
| 6,573,995 B1 | * | 6/2003 | Beutner et al. ............ | 250/227.25 |
| 2004/0042223 A1 | | 3/2004 | Schmitt et al. | |
| 2006/0076477 A1 | * | 4/2006 | Ishikawa .................. | 250/227.25 |
| 2009/0128629 A1 | * | 5/2009 | Egbert et al. ................. | 348/148 |

FOREIGN PATENT DOCUMENTS

| | | |
|---|---|---|
| EP | 1 312 521 | 5/2003 |
| EP | 1 514 750 | 3/2005 |
| JP | 62-148926 | 9/1987 |
| JP | 62-253540 | 11/1987 |
| JP | 63-045930 | 2/1988 |
| JP | 2002-039858 | 2/2002 |
| JP | 2004-142536 | 5/2004 |
| JP | 2004-274407 | 9/2004 |

OTHER PUBLICATIONS

Japanese Office Action dated Nov. 4, 2009, issued in corresponding Japanese Application No. 2007-322579, with English translation.
Japanese Office Action dated May 25, 2010, issued in corresponding Japanese Application No. 2007-322579, with English translation.

* cited by examiner

*Primary Examiner* — Georgia Y Epps
*Assistant Examiner* — Kevin Wyatt
(74) *Attorney, Agent, or Firm* — Nixon & Vanderhye PC

(57) ABSTRACT

A light sensor for detecting brightness of an outside of a vehicle includes: a light shielding element on a windshield; a light guiding element in a through hole of the light shielding element; and a light receiving element that receives light from the outside of the vehicle via the light guiding element and the windshield. The light guiding element includes an entrance surface facing the windshield and an output surface facing the light receiving element. The entrance surface receives the light from the outside. The light guiding element transmits and outputs the light from the output surface toward the light receiving element. The entrance surface has a top disposed inside of the through hole.

6 Claims, 2 Drawing Sheets

LIGHT SENSOR FOR DETECTING BRIGHTNESS

CROSS REFERENCE TO RELATED APPLICATION

This application is based on Japanese Patent Application No. 2007-322579 filed on Dec. 13, 2007, the disclosure of which is incorporated herein by reference.

FIELD OF THE INVENTION

The present invention relates to a light sensor for detecting brightness of an outside of a vehicle with high accuracy.

BACKGROUND OF THE INVENTION

A light sensor is suitably used for control of switching on and off of a lamp mounted on a vehicle.

The light sensor includes a light receiving element and a light guiding element for introducing the light to the light receiving element. The light is entered from the outside of the vehicle into the compartment of the vehicle via a windshield, and the light is introduced to the light receiving element through the light guiding element. This light sensor is disclosed in JP-A-2002-500769 corresponding to U.S. Pat. No. 6,376,824.

The light sensor is attached to a surface of the windshield on a compartment side (i.e., an inside of the vehicle) so that the brightness of the outside of the vehicle is accurately detected. Accordingly, the light guiding element is arranged near the surface of the windshield on the compartment side.

In an automatic lighting system of the vehicle, the lamp is controlled to turn on and off on the basis of the brightness of the outside in front of the vehicle, which is detected by the light sensor. For example, even if it is not necessary to turn on the lamp such as a head lamp since the outside of the vehicle is bright during the daytime, when the vehicle approaches a tunnel in front of the vehicle, it is preferable to turn on the head lamp. In this case, it is necessary to detect the tunnel before the vehicle reaches the entrance of the tunnel. Further, when the vehicle approaches an overpass in front of the vehicle during the daytime, it is preferable to pass under the overpass without turning on the head lamp. To control the head lamp in this manner, it is preferable to introduce the light only from the forward of the vehicle into the light sensor.

In a conventional light sensor, the light guiding element for introducing the light to the light receiving element through the windshield is arranged behind the windshield. In general, the windshield is inclined toward the front of the vehicle. Specifically, the top of the windshield is disposed on the rear side of the vehicle, and the bottom of the windshield is disposed on the front side of the vehicle. Accordingly, an entrance surface of the light guiding element in the conventional light sensor is also inclined toward the front of the vehicle so that the entrance surface is in parallel to the windshield. The entrance surface of the light guiding element faces the windshield. Thus, not only the light from the forward of the vehicle but also the light from the upside of the vehicle are introduced into the entrance surface of the light guiding element. Specifically, the light along with the horizontal direction and the light in the vertical direction are entered into the entrance surface. Accordingly, it is difficult to detect the brightness in front of the vehicle with high accuracy.

Another conventional illuminant sensor includes a light guiding element having an entrance surface, which provides a convexity lens. Thus, the entrance surface is formed to have a spherical surface, the convexity of which faces the windshield. In this case, the light from the forward of the vehicle, the light from the upside and downside of the vehicle and the light from the right side and the left side of the vehicle are entered into the entrance surface of the light guiding element. Thus, it is difficult to detect the brightness in front of the vehicle with high accuracy.

In view of the above difficulty, it is required to detect the brightness in front of the vehicle with high accuracy.

SUMMARY OF THE INVENTION

In view of the above-described problem, it is an object of the present disclosure to provide a light sensor for detecting brightness of an outside of a vehicle with high accuracy.

According to a first aspect of the present disclosure, a light sensor for detecting brightness of an outside of a vehicle includes: a light shielding element mounted on an inner surface of a windshield of the vehicle, wherein the light shielding element includes a through hole; a light guiding element disposed in the through hole of the light shielding element; and a light receiving element that receives light from the outside of the vehicle via the light guiding element and the windshield. The light receiving element outputs a signal corresponding to an amount of the light. The light guiding element includes an entrance surface facing the windshield and an output surface facing the light receiving element. The entrance surface of the light guiding element receives the light from the outside of the vehicle via the windshield. The light guiding element transmits the light therein and outputs the light from the output surface of the light guiding element toward the light receiving element. The entrance surface has a top, which is disposed inside of the through hole.

In the above device, the light from the front of the vehicle in the horizontal direction of the vehicle is entered into the light guiding element. Accordingly, the device detects the brightness in front of the vehicle with high accuracy.

According to a second aspect of the present disclosure, a light sensor for detecting brightness of an outside of a vehicle includes: a light guiding element disposed in a compartment of the vehicle; and a light receiving element that receives light from an outside of the vehicle via the light guiding element. The light receiving element outputs a signal corresponding to an amount of the light. The light guiding element includes an entrance surface facing a windshield of the vehicle and an output surface facing the light receiving element. The entrance surface of the light guiding element receives the light from the outside of the vehicle via the windshield. The light guiding element transmits the light therethrough and outputs the light from the output surface of the light guiding element toward the light receiving element. The entrance surface of the light guiding element has a normal line, which is in parallel to a horizontal direction of the vehicle, or inclined downward with respect to the horizontal direction of the vehicle.

In the above device, the light from the front of the vehicle in the horizontal direction of the vehicle is entered into the light guiding element. Accordingly, the device detects the brightness in front of the vehicle with high accuracy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A light sensor according to a first embodiment will be explained as follows. The sensor is suitably used as a light detection device for a lamp control system of a vehicle.

Figure 1:
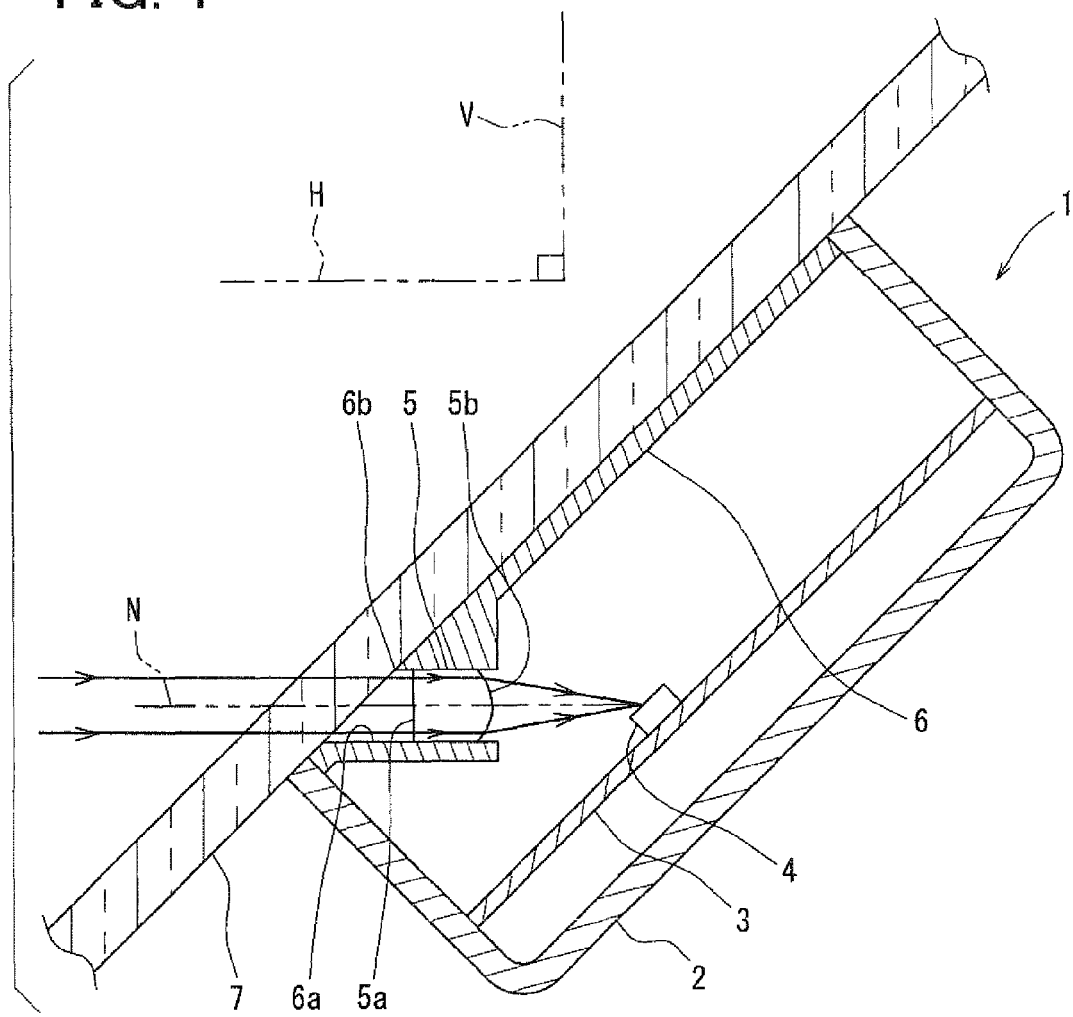
FIG. 1 is a diagram illustrating a cross section of a light detection device attached to a windshield according to a first embodiment.

The light detection device 1 is shown in FIG. 1. The device 1 is directly attached to a surface of a windshield 7 on a compartment side of the vehicle. The device 1 is arranged at a position such as a position behind a rear view mirror, the position which does not prevent a driver's front view. The device 1 is attached to the windshield 7 via a light transparent tape or a light transparent bracket. In FIG. 1, a direction H represents a horizontal direction of the vehicle, i.e., a front-rear direction of the vehicle. A direction V represents a vertical direction of the vehicle, i.e., an up-down direction of the vehicle. Specifically, the left side of FIG. 1 shows a front side of the vehicle, and the upside of FIG. 1 shows the upside of the vehicle. The windshield 7 is inclined toward the front side of the vehicle. The windshield 7 is inclined from the bottom to the top of the windshield 7 as it goes from the front side to the rear side of the vehicle.

A lamp control system starts to function when a lamp control switch of the vehicle switches to an automatic control position. Based on a detection signal of the light detection device 1, the system calculates the brightness of the outside in front of the vehicle. The system controls the lamp such as a headlight and a width indicator to turn on and off automatically in accordance with the brightness.

The light detection device 1 includes a housing 2, a circuit substrate 3, a photo diode 4 as a light receiving element, a light guiding element 5 and a cover 6.

The housing 2 is made of resin and formed by a molding method. The housing 2 has a box shape with a bottom and an opening. The opening of the housing 2 faces the windshield 7. The opening of the housing 2 is covered with the cover 6.

The circuit substrate 3 is made of, for example, a glass epoxy substrate. The substrate 3 provides an electric circuit portion of the light detection device 1. The photo diode 4 is mounted on the substrate 3. Further, a signal processor such as a micro computer (not shown) is mounted on the substrate 3. The signal processor calculates an output signal from the photo diode 4 and determines the brightness of the outside.

The photo diode 4 as the light receiving element is, for example, a chip type diode.

The light guiding element 5 is made of light transparent material such as glass and transparent resin. The light from the front side of the vehicle is entered into the compartment of the vehicle via the windshield 7. Then, the light is introduced to the photo diode 4. The light guiding element 5 has an almost cylindrical shape. The light guiding element 5 includes an entrance surface 5a and an output surface 5b. The light from the outside of the vehicle in front of the vehicle enters into the compartment of the vehicle, and the light is introduced in the entrance surface 5a. Then, the light transmits through the light guiding element 5. The light is output from the output surface 5b toward the photo diode 4. The entrance surface 5a has a flat surface, and faces the windshield 7. The entrance surface 5a is perpendicular to an axis of the cylindrical shape of the light guiding element 5. The output surface 5b faces the photo diode 4, and provides a convexity lens, which protrudes toward the photo diode 4. The light transmits through the light guiding element 5 so that the light becomes parallel beam. The parallel beam is output from the output surface 5b. Then, the parallel beam is concentrated at a focal point by lens effect of the convexity lens. In the light detection device 1, a light receiving surface of the photo diode 4 is arranged at the focal point of the convexity lens of the output surface 5b in the light guiding element 5. Thus, the light amount to be introduced into the photo diode 4 is maximized, so that detection accuracy of the device 1 is improved. The output surface 5b of the light guiding element 5 has a normal line N, which coincides with a horizontal direction H of the vehicle when the light detection device 1 is attached to the windshield 7 of the vehicle. Specifically, the normal line N of the output surface 5b is in parallel to the horizontal direction H of the vehicle. Thus, the axis of the light guiding element 5 is in parallel to the horizontal direction H.

The cover 6 is made of light-block material so that the cover 6 blocks the light. For example, the cover 6 is made of resin or metal. The cover 6 is attached to a periphery of the opening of the housing 2. The cover 6 includes a through hole 6a for holding the light guiding element 5 therein so that the through hole 6 provides a holding hole. The through hole 6a has a diameter, which is substantially equal to the outer diameter of the light guiding element 5. The through hole 6a has an axis, which coincides with the horizontal direction H of the vehicle when the light detection device 1 is mounted on the windshield 7. Accordingly, since the light guiding element 5 is engaged in and inserted in the through hole 5a, the normal line N of the entrance surface 5a of the light guiding element 5 coincides with the horizontal direction H of the vehicle.

The light guiding element 5 is attached in the through hole 6a of the cover 6 such that an edge of the entrance surface 5a of the light guiding element 5 is not exposed from the cover 6 in the vertical direction V of the vehicle. Specifically, the light guiding element 5 is inserted in the through hole 6a such that the entrance surface 5a is retracted behind an edge 6b of the through hole 6a so that the entrance surface 5a is disposed inside of the through hole 6a. The edge 6b is a windshield side edge of the through hole 6a. Thus, a portion of the cover 6 near the edge 6b has a triangle cross section, which has a side slanting with respect to the axis of the through hole 6a. Further, the output surface 5b of the light guiding element 5 is disposed inside of the through hole 6a such that the output surface 5b is retracted behind another edge of the through hole, which is opposite to the windshield side edge 6b. The other edge is a compartment side edge of the through hole 6a.

The operation of the light detection device 1 will be explained as follows.

The light entered from the front of the vehicle in the horizontal direction, i.e., the light entered in the entrance surface 5a of the light guiding element 5 from the front side of the vehicle, proceeds along with an arrow shown in FIG. 1. Then, the light goes through the light guiding element 5, and enters into the photo diode 4. The photo diode 4 outputs the detection signal corresponding to the light amount of the light entered into the photo diode 4.

The light enters in the windshield 7 from all directions including the front direction of the vehicle. In the conventional light sensor, the entrance surface of the light guiding element is in parallel to the windshield so that the entrance surface is a slant surface. Accordingly, not only the light from the front direction of the vehicle along with the horizontal direction but also the light from the upside of the vehicle along with the vertical direction enter in the windshield. All of the light enters into the light receiving element, so that it is difficult to detect the brightness in front of the vehicle with high accuracy.

In the light detection device 1, the light guiding element 5 is retracted behind the windshield side edge 6b of the through hole 6a so that the light guiding element 5 is disposed inside of the through hole 6a. Thus, the top of the entrance surface 5a of the light guiding element 5 is not exposed from the through hole 6a in the vertical direction V. Accordingly, the light other than the light from the front of the vehicle in the horizontal direction is not substantially entered into the entrance surface 5a. Specifically, the light from the upside of the vehicle and the light from the obliquely upside of the vehicle are not entered into the entrance surface 5a. Accordingly, the light to be entered into the entrance surface 5a of the light guiding element 5 is limited to the light from the front of the vehicle or the light from the slightly oblique upside of the vehicle. The slightly oblique upside has a small slanting angle with respect to the horizontal direction H of the vehicle. Thus, the light detection device 1 can detect the brightness in front of the vehicle with high accuracy.

In the light detection device 1, the entrance surface 5a of the light guiding element 5 is flat. Further, the normal line N of the entrance surface 5a coincides with the horizontal direction H of the vehicle when the light detection device 1 is mounted on the vehicle. Thus, the angle range of the light to be entered into the entrance surface 5a of the light guiding element 5 is narrower than that of the convexity or concavity entrance surface of the conventional light sensor. Further, the light receiving area of the light guiding element 5 with respect to the light from the upside and the obliquely upside of the vehicle is smaller than that of the conventional light sensor having the slanting entrance surface in parallel to the windshield. Furthermore, the entrance surface 5a substantially faces the front of the vehicle, i.e., the entrance surface 5a is substantially perpendicular to the horizontal direction of the vehicle. Therefore, only the light from the front of the vehicle is selectively entered into the entrance surface 5a so that only the light from the front of the vehicle is introduced into the photo diode 4. Accordingly, the light detection device 1 detects the brightness in front of the vehicle with high accuracy.

Figure 2:
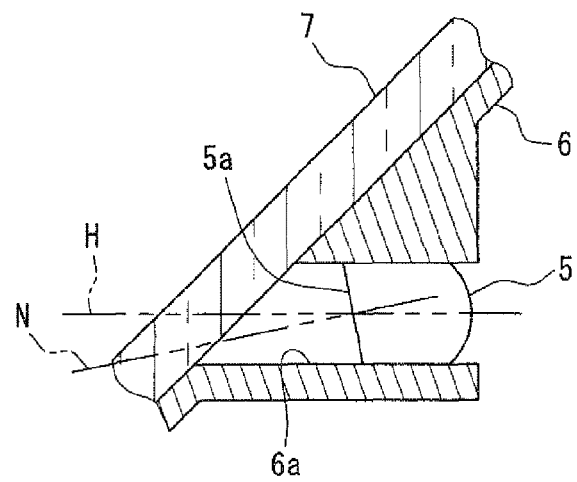
FIG. 2 is a diagram illustrating a partial cross section of a light detection device according to a modification of the first embodiment.

In the device 1, the entrance surface 5a is flat, and the normal line N of the entrance surface 5a is in parallel to the horizontal direction of the vehicle. Alternatively, the normal line N of the entrance surface 5a may be slightly inclined downward, as shown in FIG. 2, when the device 1 is mounted on the vehicle. Specifically, the entrance surface 5a is inclined with respect to the horizontal direction H of the vehicle. In this case, only the light from the front of the vehicle is selectively entered into the entrance surface 5a so that the light is introduced into the photo diode 4.

Second Embodiment

Figure 3:
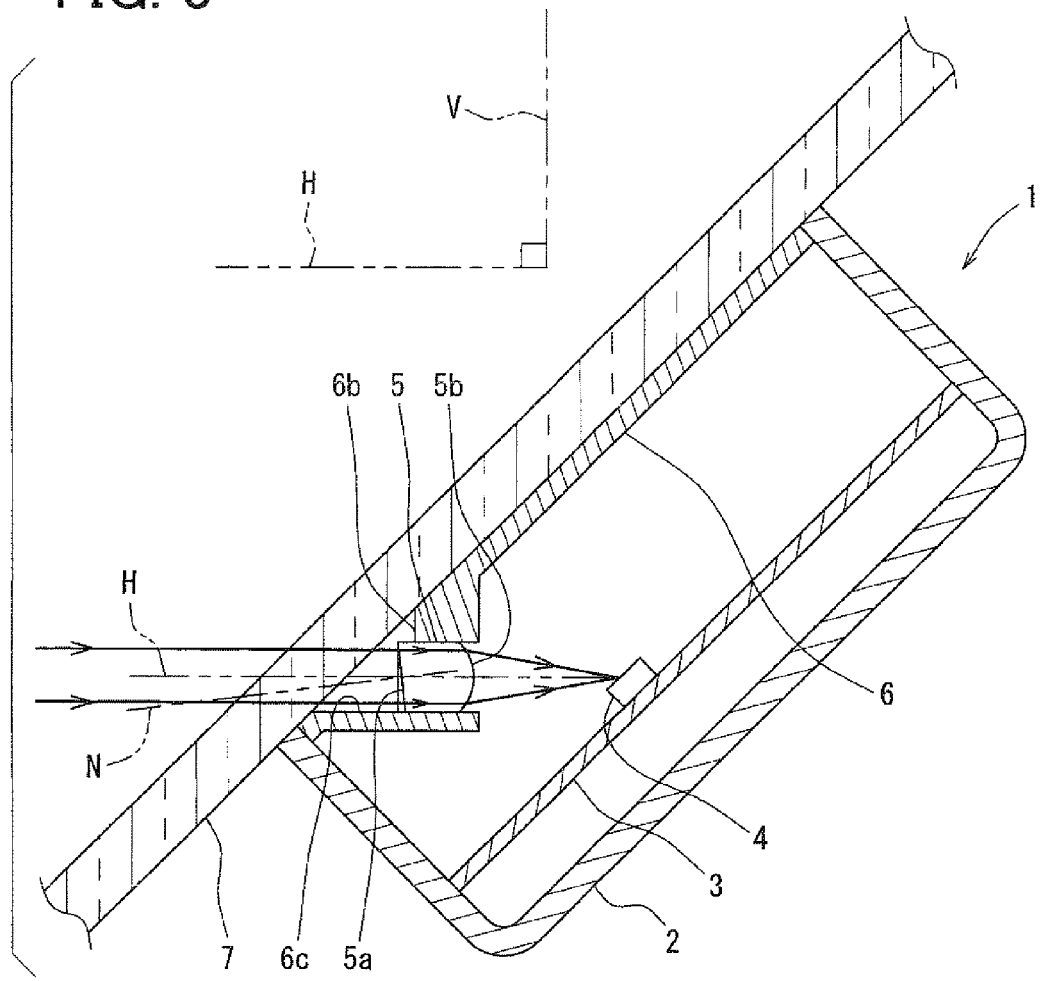
FIG. 3 is a diagram illustrating a cross section of a light detection device attached to a windshield according to a second embodiment.

A light detection device 1 according to a second embodiment will be explained. In the device 1, the light guiding element 5 and its arrangement in the through hole 6a in FIG. 3 are different from those in FIG. 1. Specifically, in FIG. 1, the top of the light guiding element 5 is not exposed from the through hole 6a in the vertical direction. In FIG. 3, a part of the light guiding element 5, i.e., the top of the windshield side edge of the light guiding element 5 is exposed from the through hole 6a in the vertical direction.

The light guiding element 5 has the entrance surface 5a, which is flat. The normal line N of the entrance surface 5a is slightly inclined downward with respect to the horizontal direction H of the vehicle when the device 1 is mounted on the vehicle. The cover 6 has the windshield side edge 6b of the through hole 6a, which is retracted behind the windshield 7, so that an opening 6c of the through hole 6a is larger than that in FIG. 1. The light guiding element 5 protrudes from the opening 6c of the through hole 6a.

In this case, processing accuracy of the shape of the through hole 6a and assembling accuracy of the light guiding element 5 in the through hole 6a of the cover 6 are relaxed so that manufacturing productivity is increased. Although the light guiding element 5 protrudes from the opening 6c of the through hole 6a, the light from the upside of the vehicle and the light from the obliquely upside of the vehicle are prevented from being entered into the entrance surface 5a of the light guiding element 5.

Figure 4:
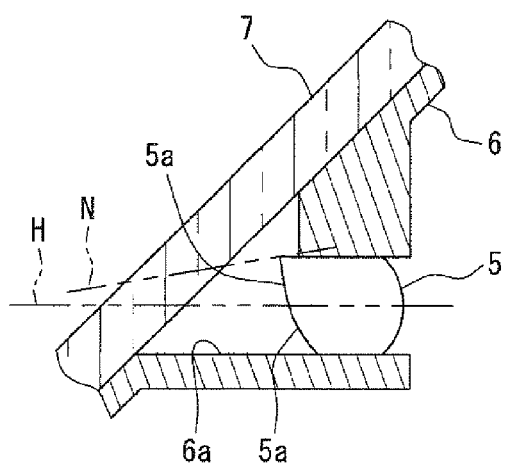
FIG. 4 is a diagram illustrating a partial cross section of a light detection device according to a modification of the second embodiment.

FIG. 4 shows another light detection device 1 according to a modification of the second embodiment. In FIG. 4, the entrance surface 5a of the light guiding element 5 has a convexity shape, which protrudes toward the windshield 7. Further, the normal line N at any point of the entrance surface 5a is inclined downward with respect to the horizontal direction H when the device 1 is mounted on the vehicle. For example, the normal line N near the top edge of the entrance surface 5a is inclined downward with respect to the horizontal direction H of the vehicle. Accordingly, even when the entrance surface 5a has the convexity shape such as a semispherical shape, the light from the upside of the vehicle and the light from the obliquely upside of the vehicle are prevented from being entered into the light guiding element 5. Further, the shape of the cover 6 is simplified.

(Modifications)

Although the device 1 has the photo diode 4 as the light receiving element, the device 1 may have another light receiving element such as a photo transistor.

Although the device 1 detects the brightness in front of the vehicle, the device 1 may have another function. For example, the device 1 may be integrated with a water drop detection device so that the device 1 detects water drop and the brightness. Here, the water drop detection device is suitably used for a wiper control system.

The light detection device 1 as the light sensor is used for the lamp control system for the vehicle. Alternatively, the light detection device 1 may be used for another system.

Although the light detection device 1 is mounted on the vehicle, the light detection device 1 may be mounted on an airplane, a train, a ship, a mobile body or the like.

The above disclosure has the following aspects.

According to a first aspect of the present disclosure, a light sensor for detecting brightness of an outside of a vehicle includes: a light shielding element mounted on an inner surface of a windshield of the vehicle, wherein the light shielding element includes a through hole; a light guiding element disposed in the through hole of the light shielding element; and a light receiving element that receives light from the outside of the vehicle via the light guiding element and the windshield. The light receiving element outputs a signal corresponding to an amount of the light. The light guiding element includes an entrance surface facing the windshield and an output surface facing the light receiving element. The entrance surface of the light guiding element receives the light from the outside of the vehicle via the windshield. The light guiding element transmits the light therein and outputs the light from the output surface of the light guiding element toward the light receiving element. The entrance surface has a top, which is disposed inside of the through hole.

In the above device, the light from the front of the vehicle in the horizontal direction of the vehicle is entered into the light guiding element. Accordingly, the device detects the brightness in front of the vehicle with high accuracy.

Alternatively, the entrance surface of the light guiding element may have a normal line, which is in parallel to a horizontal direction of the vehicle. Further, the entrance surface of the light guiding element may be flat.

Alternatively, the entrance surface of the light guiding element may be inclined downward with respect to the horizontal direction of the vehicle.

Alternatively, the through hole may include a first edge facing the windshield and a second edge facing the light receiving element, and the entrance surface of the light guiding element is retracted behind the first edge of the through hole, and the output surface of the light guiding element is retracted behind the second edge of the through hole. Further, the entrance surface of the light guiding element may be flat, and the output surface of the light guiding element may be convex so that the output surface provides a convex lens, and the convex lens has a focal point, at which the light receiving element is disposed. Furthermore, the entrance surface of the light guiding element may have a normal line, which is in parallel to a horizontal direction of the vehicle, and wherein the light guiding element has a cylindrical shape with a center axis, which is equal to a normal line of the entrance surface. Furthermore, the entrance surface of the light guiding element may be inclined downward with respect to the horizontal direction of the vehicle, and the light guiding element has a cylindrical shape with a center axis, which is inclined with respect to a normal line of the entrance surface.

According to a second aspect of the present disclosure, a light sensor for detecting brightness of an outside of a vehicle includes: a light guiding element disposed in a compartment of the vehicle; and a light receiving element that receives light from an outside of the vehicle via the light guiding element. The light receiving element outputs a signal corresponding to an amount of the light. The light guiding element includes an entrance surface facing a windshield of the vehicle and an output surface facing the light receiving element. The entrance surface of the light guiding element receives the light from the outside of the vehicle via the windshield. The light guiding element transmits the light therethrough and outputs the light from the output surface of the light guiding element toward the light receiving element. The entrance surface of the light guiding element has a normal line, which is in parallel to a horizontal direction of the vehicle, or inclined downward with respect to the horizontal direction of the vehicle.

In the above device, the light from the front of the vehicle in the horizontal direction of the vehicle is entered into the light guiding element. Accordingly, the device detects the brightness in front of the vehicle with high accuracy.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A light sensor for detecting brightness of an outside of a vehicle comprising:
   a light shielding element mounted on an inner surface of a windshield of the vehicle, wherein the light shielding element includes a through hole;
   a light guiding element disposed in the through hole of the light shielding element; and
   a light receiving element that receives light from the outside of the vehicle via the light guiding element and the windshield,
   wherein the light receiving element outputs a signal corresponding to an amount of the light,
   wherein the light guiding element includes an entrance surface facing the windshield and an output surface facing the light receiving element,
   wherein the entrance surface of the light guiding element receives the light from the outside of the vehicle via the windshield,
   wherein the light guiding element transmits the light therein and outputs the light from the output surface of the light guiding element toward the light receiving element,
   wherein the entrance surface has a top, which is disposed inside of the through hole,
   wherein the entrance surface of the light guiding element has a normal line, which is in parallel to a horizontal direction of the vehicle, and
   wherein the entrance surface of the light guiding element is flat.

2. A light sensor for detecting brightness of an outside of a vehicle comprising:
   a light shielding element mounted on an inner surface of a windshield of the vehicle, wherein the light shielding element includes a through hole;
   a light guiding element disposed in the through hole of the light shielding element; and
   a light receiving element that receives light from the outside of the vehicle via the light guiding element and the windshield,
   wherein the light receiving element outputs a signal corresponding to an amount of the light,
   wherein the light guiding element includes an entrance surface facing the windshield and an output surface facing the light receiving element,
   wherein the entrance surface of the light guiding element receives the light from the outside of the vehicle via the windshield,
   wherein the light guiding element transmits the light therein and outputs the light from the output surface of the light guiding element toward the light receiving element,
   wherein the entrance surface has a top, which is disposed inside of the through hole,
   wherein the entrance surface of the light guiding element is inclined downward with respect to the horizontal direction of the vehicle, and
   wherein the entrance surface of the light guiding element is flat.

3. A light sensor for detecting brightness of an outside of a vehicle comprising:
   a light shielding element mounted on an inner surface of a windshield of the vehicle, wherein the light shielding element includes a through hole;

a light guiding element disposed in the through hole of the light shielding element; and a light receiving element that receives light from the outside of the vehicle via the light guiding element and the windshield, wherein the light receiving element outputs a signal corresponding to an amount of the light, wherein the light guiding element includes an entrance surface facing the windshield and an output surface facing the light receiving element, wherein the entrance surface of the light guiding element receives the light from the outside of the vehicle via the windshield, wherein the light guiding element transmits the light therein and outputs the light from the output surface of the light guiding element toward the light receiving element, wherein the entrance surface has a top, which is disposed inside of the through hole, wherein the through hole includes a first edge facing the windshield and a second edge facing the light receiving element, wherein the entrance surface of the light guiding element is retracted behind the first edge of the through hole, and the output surface of the light guiding element is retracted behind the second edge of the through hole, wherein the entrance surface of the light guiding element is flat, and the output surface of the light guiding element is convex so that the output surface provides a convex lens, and the convex lens has a focal point, at which the light receiving element is disposed.

4. The light sensor according to claim 3, wherein the entrance surface of the light guiding element has a normal line, which is in parallel to a horizontal direction of the vehicle, and wherein the light guiding element has a cylindrical shape with a center axis, which is equal to a normal line of the entrance surface.

5. The light sensor according to claim 3, wherein the entrance surface of the light guiding element is inclined downward with respect to the horizontal direction of the vehicle, and wherein the light guiding element has a cylindrical shape with a center axis, which is inclined with respect to a normal line of the entrance surface.

6. A light sensor for detecting brightness of an outside of a vehicle comprising:

a light guiding element disposed in a compartment of the vehicle; and a light receiving element that receives light from an outside of the vehicle via the light guiding element, wherein the light receiving element outputs a signal corresponding to an amount of the light, wherein the light guiding element includes an entrance surface facing a windshield of the vehicle and an output surface facing the light receiving element, wherein the entrance surface of the light guiding element receives the light from the outside of the vehicle via the windshield, wherein the light guiding element transmits the light therethrough and outputs the light from the output surface of the light guiding element toward the light receiving element, and wherein the entrance surface of the light guiding element has a normal line, which is in parallel to a horizontal direction of the vehicle, or inclined downward with respect to the horizontal direction of the vehicle, and wherein the entrance surface of the light guiding element is flat.

* * * * *